United States Patent [19]

Roberts et al.

[11] Patent Number: 5,433,548
[45] Date of Patent: Jul. 18, 1995

[54] UNIVERSAL JOINT FOR TORQUE TRANSMITTING TOOLS

[75] Inventors: Peter M. Roberts, Chattanooga, Tenn.; John B. Davidson, Chicago, Ill.

[73] Assignee: Roberts Tool International (USA), Inc., Chicago, Ill.

[21] Appl. No.: 125,328

[22] Filed: Sep. 22, 1993

[51] Int. Cl.⁶ ............................................. F16C 11/06
[52] U.S. Cl. ............................................. 403/74; 403/322; 81/177.75; 81/177.85
[58] Field of Search ........................ 403/74, 57, 19, 20, 403/322, 325, 321; 81/177.85, 177.75

[56] References Cited

U.S. PATENT DOCUMENTS

| | | | |
|---|---|---|---|
| 1,864,466 | 6/1932 | Peterson | 81/177.85 |
| 2,162,359 | 6/1939 | Rhinevault | 81/177.85 |
| 2,987,334 | 6/1961 | Wendling | 81/177.75 |
| 3,208,318 | 9/1965 | Roberts | . |
| 3,815,451 | 6/1974 | Penner | . |
| 3,924,493 | 12/1975 | Penner | 81/177.85 |
| 4,245,528 | 1/1981 | Hugh et al. | . |
| 4,614,457 | 9/1986 | Sammon | 81/177.85 |
| 4,781,085 | 11/1988 | Fox | 81/177.85 |
| 4,794,828 | 1/1989 | Olson | . |
| 4,817,475 | 4/1989 | Kelly et al. | . |
| 4,848,196 | 7/1989 | Roberts | . |
| 4,941,862 | 7/1990 | Hazebrook et al. | . |
| 5,090,275 | 2/1992 | McCann | 403/322 |
| 5,214,986 | 6/1993 | Roberts | . |
| 5,216,940 | 6/1993 | Hedden | . |
| 5,233,892 | 8/1993 | Roberts | 81/177.85 |

Primary Examiner—Edward K. Look
Assistant Examiner—Mark Sgantzos
Attorney, Agent, or Firm—Willian Brinks Hofer Gilson & Lione

[57] ABSTRACT

A socket wrench universal joint includes a socket engaging element movably mounted in the drive stud of the universal joint to engage a socket. An actuator is mounted to the universal joint for manipulation by a user, and a linking element links the actuator and the socket engaging element. The actuator allows the user to alter the socket retaining forces. In a quick release version the operator can release a socket from the drive stud of the universal joint by appropriately manipulating the actuator. In another version the user can enhance socket retaining forces by properly manipulating the actuator.

25 Claims, 4 Drawing Sheets

UNIVERSAL JOINT FOR TORQUE TRANSMITTING TOOLS

BACKGROUND OF THE INVENTION

This invention relates to a universal joint of the type comprising first and second parts, wherein the first part defines a recess configured to receive a drive stud of a torque transmitting tool and the second part comprises a drive stud configured to engage a tool head. At least one coupling element is positioned between the first and second parts to transmit torque therebetween while allowing the first and second parts to rotate with the first part positioned in a skew orientation with respect to the second part.

Universal joints of this type are in common use with torque transmitting tools such as socket wrenches. See for example the constant velocity type universal joint described in Hazebrook U.S. Pat. No. 4,941,8622. Conventional universal joints include a spring biased detent ball on the drive stud that engages the recess of the tool head that is mounted to the universal joint to provide a retention force that cannot be readily altered or selected by the user.

This arrangement is not without disadvantages. In particular, on some occasions it would be preferable if a tool head were held in place in the drive stud more securely and more positively. On other occasions it would be preferable if a tool head could be released from the drive stud so as to drop freely from the drive stud and allow one hand removal of the tool head mounted on the drive stud.

SUMMARY OF THE INVENTION

The present invention is directed to an improved universal joint that allows a user to control tool head retention forces manually.

According to this invention, a universal joint of the type described initially above is provided with an engaging element movably mounted in the drive stud of the second part to engage the tool head when in an engaging position and to release the tool head when in a releasing position. An actuator is mounted to one of the first and second parts for manipulation by a user between first and second positions. A linking element is movable by the actuator and is coupled to the engaging element to alter effectiveness of the engaging element in retaining a tool head on the drive stud of the second part, thereby allowing the user to control said retention forces manually.

In a first group of embodiments the linking element accommodates movement of the tool head engaging element to allow the user to release the tool head from the second part by moving the actuator to the first position. The quick release embodiments of this invention described below allow one hand removal of a tool head from a universal joint. The user can simply manipulate the actuator to release the tool head from the drive stud of the universal joint, allowing the tool head to fall from the drive stud.

In a second group of embodiments the linking element is configured to allow the tool head engaging element to move to the releasing position when the actuator is moved to the first position, and to hold the tool head engaging element in the engaging position when the actuator is moved to the second position to retain the tool head on the drive stud of the second part more securely when the actuator is moved to the second position. These embodiments allow a user selectively to enhance retention of a tool head on the drive stud of the universal joint, again by manipulating the actuator. This can be useful in situations where the user wishes to guard against inadvertent removal of the tool head from the universal joint during use.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
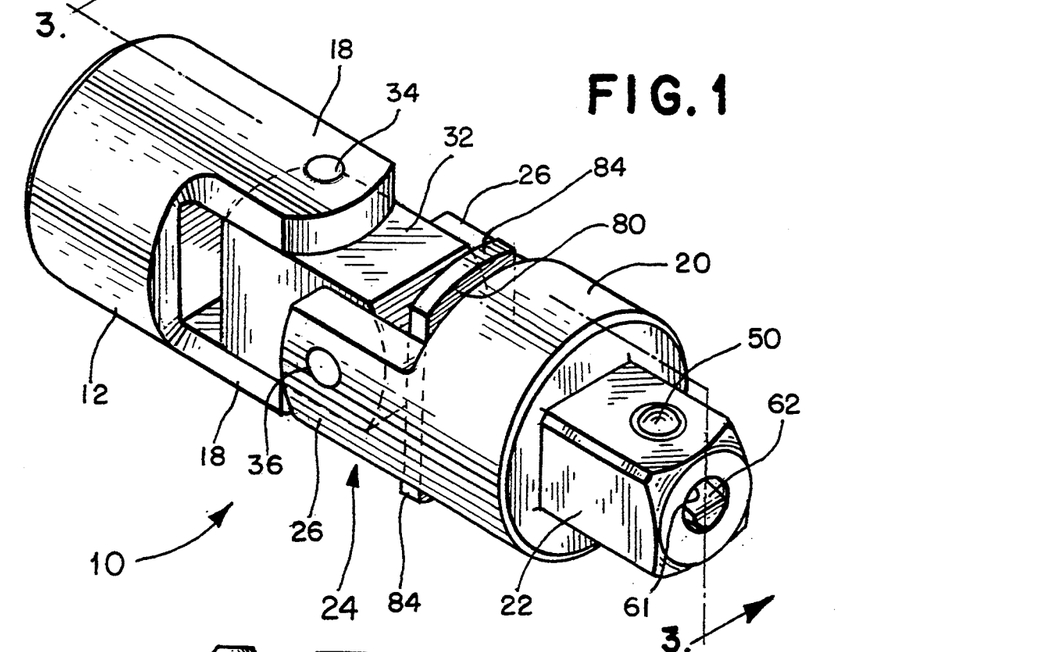
FIG. 1 is a perspective view of a universal joint which incorporates a first preferred embodiment of this invention.
Figure 2:
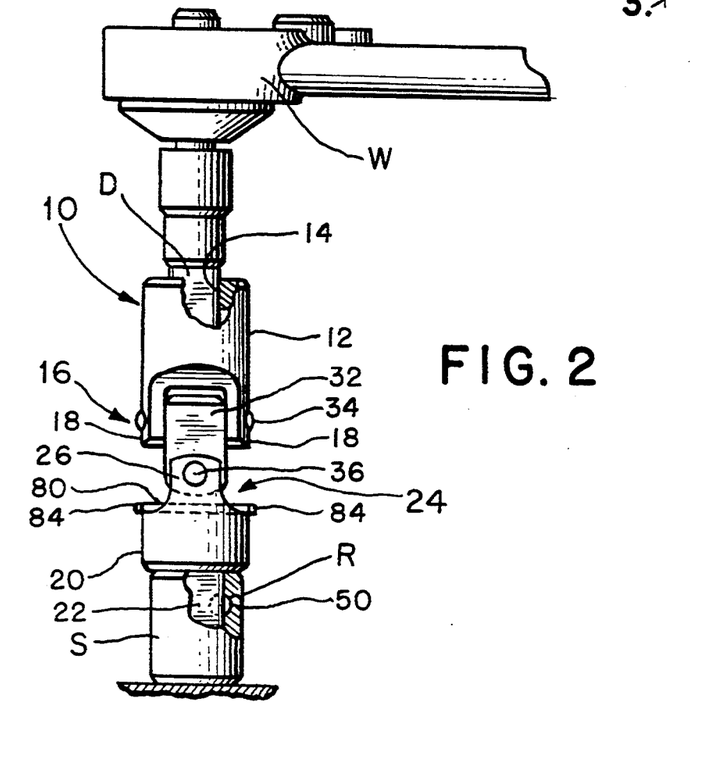
FIG. 2 is a side view in partial cutaway showing the universal joint of FIG. 1 mounted to a socket wrench and to a socket.

Turning now to the drawings, FIGS. 1-4 provide various views of a first preferred embodiment of the universal joint of this invention. The universal joint 10 includes a first part 12 and a second part 20. The first part 12 defines a recess 14 shaped to receive the drive stud D of a torque transmitting tool, which in this example is a socket wrench W with an extension bar (FIG. 2). As used herein, the term "torque transmitting tool" is intended to encompass the full range of tools for transmitting torque, including but not limited to socket wrenches, extension bars, T-bars, braces, as well as other hand and power tools. The first part 12 also defines a first joint portion 16 which includes two spaced, parallel arms 18.

The second part 20 includes a drive stud 22 shaped to engage a tool head such as a socket S, which is in turn configured to engage a workpiece such as a hexagonal bolt head or nut or other nonround workpiece (not shown) of a selected dimension. As used herein, the term "tool head" is intended to encompass the full range of devices, including but not limited to sockets, hex wrench heads, other types of wrench heads, tool bits of various types, and other types of bits including drill bits. The second part 20 also includes a second joint portion 24 which defines two spaced, parallel arms 26. A longitudinal axis 30 passes centrally through the drive stud 22.

A coupling element 32 pivotably interconnects the first and second parts 12, 20. In this embodiment the coupling element 32 is generally rectangular in shape, and it includes first and second orthogonally oriented pivot pins 34, 36. The pivot pin 34 is mounted in the first arms 18, such that the coupling element 32 is free to pivot with respect to the first part 12 about the first pivot pin 34. The second pivot pin 36 is mounted to the second arms 26, such that the second part 20 is free to pivot with respect to the coupling element 32 about the second pivot pin 36.

The foregoing features of the universal joint 10 are conventional, and they allow the first and second parts 12, 20 to rotate with the first part 12 positioned at a skew orientation with respect to the second part 20.

Figure 3:
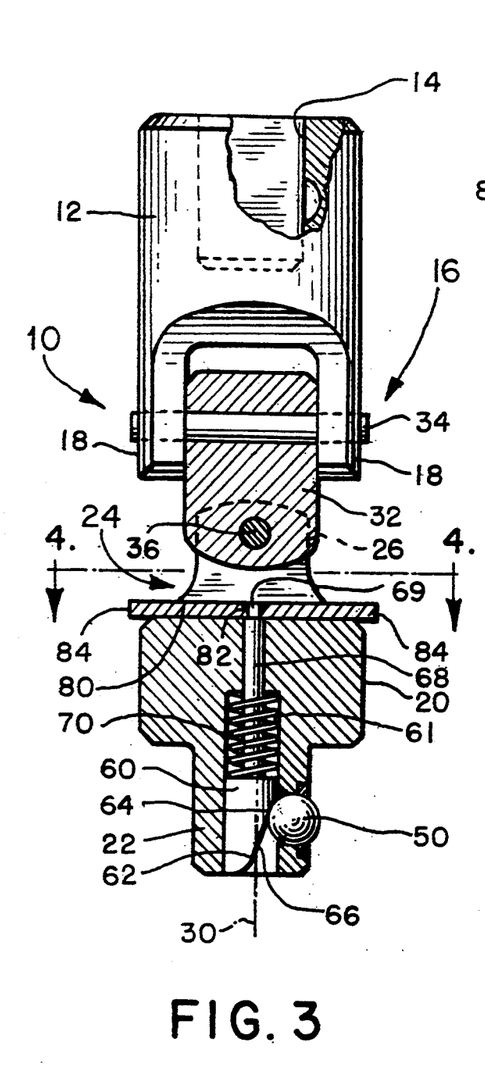
FIG. 3 is a view in partial cutaway and partial section taken along line 3—3 of FIG. 1, showing the socket engaging element in the engaging position.
Figure 4:
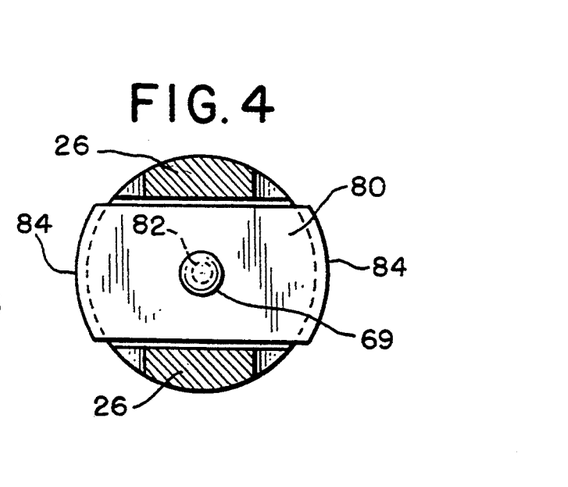
FIG. 4 is a cross-sectional view taken along line 4—4 of FIG. 3.
Figure 5:
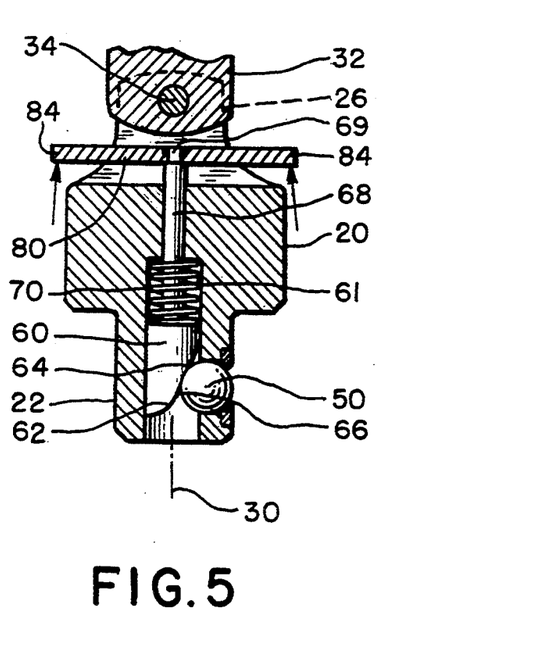
FIG. 5 is a fragmentary cross-sectional view corresponding to FIG. 3, showing the socket engaging element in the releasing position.

According to this invention, the universal joint 10 includes a tool head engaging element which can be a socket engaging element 50 which in this embodiment is spherical in shape. The socket engaging element 50 is movably mounted in the drive stud 22 such that it can be moved between an engaging position as shown in FIG. 3 and a releasing position as shown in FIG. 5. In the engaging position of FIG. 3, the socket engaging element 50 protrudes beyond the drive stud 22 to engage and retain the socket. In the releasing position of FIG. 5, the socket engaging element 50 is received entirely within the drive stud 22, thereby releasing the socket.

The position of the socket engaging element 50 is controlled at least in part by a linking element 60 which in this embodiment defines a longitudinally extending ramp 62 which is movable along the longitudinal axis 30. The linking element 60 is slideably received in a stepped bore 61 formed in the second part 20. The ramp 62 defines an elevated portion 64 and a lowered portion 66. The linking element 60 also includes a reduced diameter shaft 68 which terminates in a head 69. A spring 70, which in this embodiment is a coil compression spring, is mounted around the shaft 68 so as to bias the ramp 62 farther into the drive stud 32. In the rest position the elevated portion 64 of the ramp 62 is aligned with the socket engaging element 50, as shown in FIG. 3.

An actuator 80 which in this preferred embodiment is platelike defines an opening 82 and peripheral gripping portions 84. The actuator 80 is positioned between the second arms 26, in the region between the drive stud 22 and the coupling element 32. The shaft 68 of the linking element 60 passes through the opening 82, and the head 69 is secured to the actuator 80 to prevent the shaft 68 from moving out of the opening 82. For example, the head 69 may be welded or riveted in place on the actuator 80.

In the rest position of FIG. 3, the spring 70 holds the ramp 62 in a first position, in which the elevated portion 64 maintains the socket engaging element 50 in the engaging position of FIG. 3. When the user wishes to release a socket from the drive stud 22, the user manipulates the peripheral gripping portions 84 of the actuator 80 to move the actuator 80 to withdraw the ramp 62 partially from the drive stud 22 in this example. When the actuator 80 reaches a second position as shown in FIG. 5, in which the lowered portion 66 is aligned with the socket engaging element 50, the socket engaging element 50 is free to move radially inwardly, thereby releasing the socket. When the socket engaging element 50 is in the releasing position of FIG. 5, the socket is free to fall by force of gravity from the drive stud 22.

Depending upon the slope of the ramp 62, the universal joint 10 can be made to retain the socket with a more or less positive retention force. If the ramp 62 has a gradual slope, relatively large forces will be required to depress the socket engaging element 50 if the actuator 80 is not manipulated. With such an arrangement, a user will typically manually move the actuator 80 from the first position of FIG. 3 to the second position of FIG. 5 when moving a socket onto the drive stud 22. Alternately, if the slope of the ramp 62 is sufficiently steep, a user will be able to install a socket on the drive stud 22 simply by pushing the socket into position, without independently manipulating the actuator 80.

Figures 6, 7, 8, 9, 10, 11, 12:
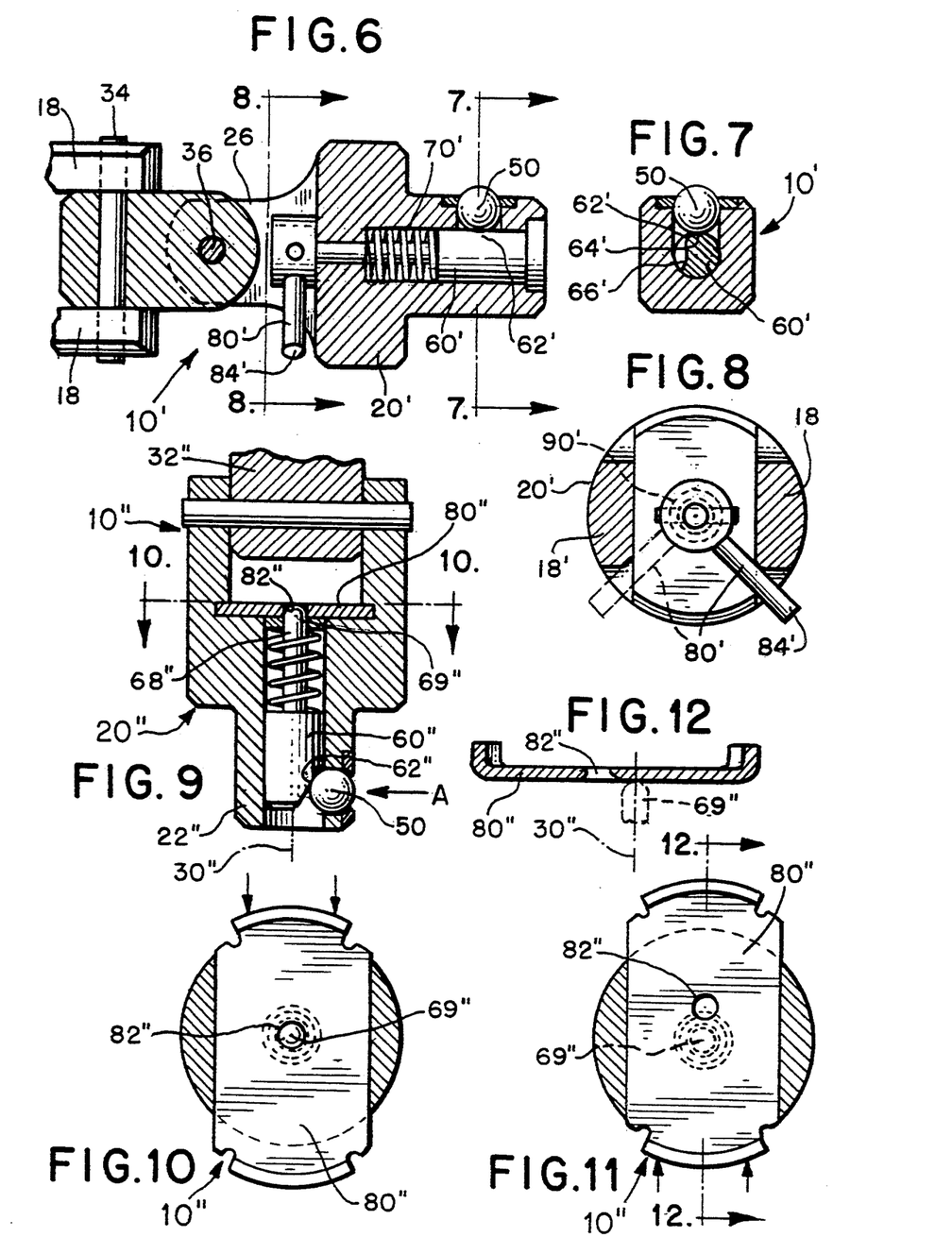
FIG. 6 is a fragmentary cross-sectional view of a second preferred embodiment which utilizes a circumferential ramp.
FIG. 7 is a cross-sectional view taken along line 7—7 of FIG. 6.
FIG. 8 is a cross-sectional view taken along line 8—8 of FIG. 6.
FIG. 9 is a fragmentary cross-sectional view of a third preferred embodiment of this invention.
FIG. 10 is a cross-sectional view taken along line 10—10 of FIG. 8, showing the element 80" shifted in the direction of the arrows.
FIG. 11 is a cross-sectional view corresponding to FIG. 10, showing the element 80" shifted in the direction of the arrows.
FIG. 12 is a fragmentary cross-sectional view taken along line 12—12 of FIG. 11.

FIGS. 6–8 relate to a second preferred embodiment 10′ which is in many ways similar to the preferred embodiment discussed above in conjunction with FIGS. 1–5. In the embodiment of FIGS. 6–8, the linking element 60′ defines a ramp 62′ which extends circumferentially around the linking element 60′. The illustrated ramp 62′ is circular, but spiral ramps are also suitable. As best shown in FIG. 7, the ramp 62′ defines an elevated portion 64′ and a lowered portion 66′ at respective angular positions of the linking element 60′. In this case the actuator 80′ is a lever arm mounted to extend to a peripheral portion of the second part 20′. The lever arm 80′ defines an extending peripheral portion 84′ which is positioned to be manipulated by a user.

The embodiment of FIGS. 6–8 operates similarly to the embodiment of FIGS. 1–5, except that the user controls the position of the linking element 60′ by rotating the actuator 80′ through an arc of about 90°. In this case the spring 70′ is a compression spring which tends to hold the linking element 60′ by friction in the position in which it was left by the user. In the position shown in FIG. 7, the socket engaging element 50 is in the engaging position. Rotation of the actuator 80′ by 90° aligns the lowered portion 66′ with the socket engaging element 50 to release a socket from the drive stud of the universal joint 10′. If desired a spring such a torsion spring or a compression spring with a spiral ramp can be used to bias the ramp to a selected position.

The universal joints 10, 10′ provide a quick release feature which is useful in many applications. FIGS. 9–12 relate to a third preferred embodiment which is designed to allow a user to choose between enhanced and reduced retention of a socket on the universal joint when desired. In this third embodiment, the universal joint 10″ includes a linking element 60″ which defines a ramp 62″ which is similar to that described above. In this case the shaft 68″ terminates in a stub shaft 69″, as shown in FIG. 9. The actuator 80″ is shaped as a plate which is mounted in the second part 20″ so as to slide at right angles to the longitudinal axis 30″. This plate 80″ defines an opening 82″ positioned selectively to block and allow movement of the linking element 60" along the longitudinal axis 30".

In the position shown in FIG. 9, the opening 82" is aligned with the stub shaft 69", and forces can be applied through the socket to the socket engaging element 50 in the direction of the arrow A to move the ramp 62" toward the coupling element 32", and the stub shaft 69" into the opening 82". This allows a user to install a socket onto the drive stud 22" by pressing it in place and to remove it by pulling it in the conventional manner. When a user desires to increase the forces tending to hold the socket in place on the drive stud 22", the user slides the actuator 80" so as to move the opening 82" out of alignment with the stub shaft 69" (FIGS. 11 and 12). In this position, the ramp 62" is blocked from moving toward the coupling element 32", and the socket is more securely held in place on the drive stud 22".

The embodiment of FIG. 9–11 does not provide a quick release function, but instead allows the user selectively to enhance the socket retaining forces in order to reduce the chance that a socket will inadvertently be removed from the drive stud.

Figure 13:
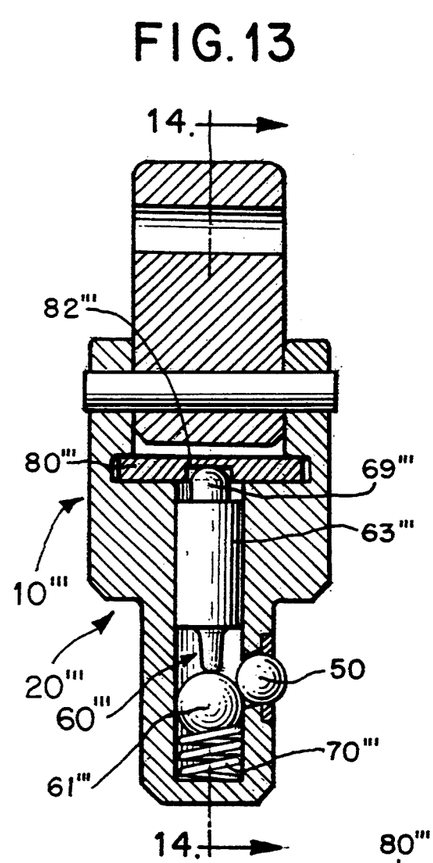
FIG. 13 is a cross-sectional view of a fourth ]preferred embodiment of this invention.
Figure 14:
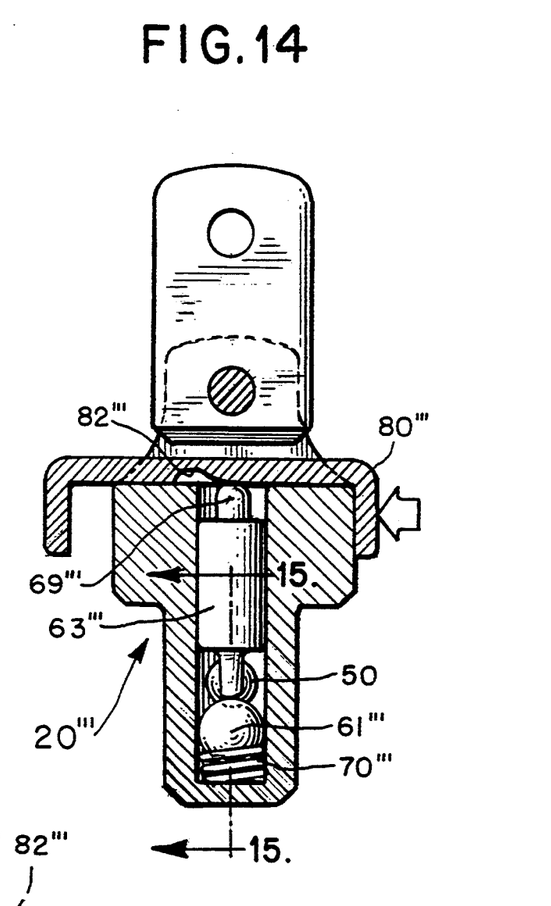
FIG. 14 is a partial cross-sectional view taken along line 14—14 of FIG. 13.
Figure 15:
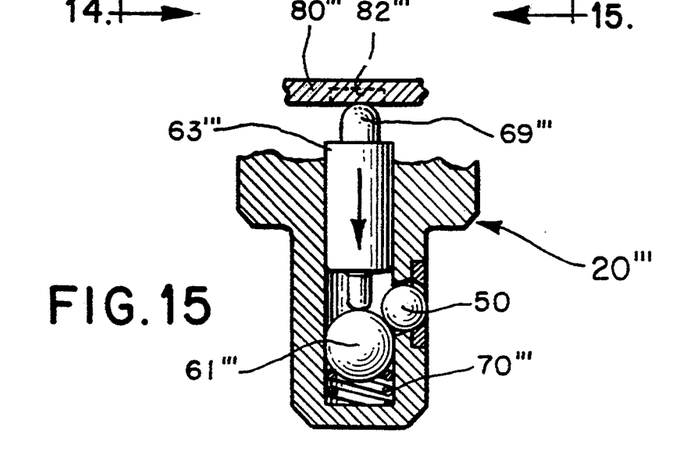
FIG. 15 is a fragmentary cross-sectional view taken along line 15—15 of FIG. 14.

FIGS. 13–15 relate to a fourth preferred embodiment which also allows the user to choose between enhanced and reduced retention of a socket on the universal joint when desired. In this fourth embodiment, the universal joint 10''' includes a socket engaging element 50, the position of which is controlled at least in part by a sphere 61''' which is biased toward the socket engaging element 50 by a compression spring 70'''. The position of the sphere 61''' is controlled in part by the position of a slide 63''' which is slideably mounted in a bore in the second part 20''' of universal joint 10'''. The position of the slide 63''' is controllable by a user by means of an actuator 80''' which defines a recess 82'''.

In this embodiment the sphere 61''' and the slide 63''' cooperate to form a two-piece linking element 60''' that couples the actuator 80''' with the socket engaging element 50.

When a user moves the actuator 80''' to the position shown in FIG. 13 the spring 70''' biases the sphere 61''' into contact with the socket engaging element 50. Depending upon the spring force developed by the spring 70''', the universal joint 10''' can be designed such that in this position the socket engaging element 50 provides a small, moderate or large retention force, as appropriate for the particular application. In some embodiments the spring force generated by the spring 70''' may be so large as effectively to prevent a socket from being removed from the second part 20''' in the great majority of situations.

When a user desires to release a socket from the second part 20''' the user can slide the actuator relative to the second part 20''' to the left as shown in FIG. 14. This movement of the actuator 80''' moves the slide 63''' toward the spring 70''', thereby moving the sphere 61''' away from the socket engaging element 50. In this position of the sphere 61''', the socket engaging element 50 is free to move inwardly, thereby releasing a retained socket. Intermediate degrees of socket retaining forces can be obtained by positioning the actuator 80''' in an intermediate position between the positions of FIGS. 13 and 14.

The embodiment of FIGS. 13–15 allows the user selectively to enhance the socket retaining forces in order to reduce the chance that a socket will inadvertently be removed from the drive stud, while still providing a quick release function.

Of course, it should be understood that a wide range of changes and modifications can be made to the preferred embodiments described above. For example, the foregoing preferred embodiments all utilize a coupling member with two orthogonal pivot axes. Alternately, this invention may be used with a universal joint of the constant velocity type having a plurality of spherical coupling members. Also, for convenience various positions of the ramps, the socket engaging elements and the actuators have been described. It will of course be understood that the term "position" is intended to encompass a range of positions, as is appropriate for sockets that have recesses of varying dimensions. Also, various other types of quick release mechanisms can be adapted for use with the universal joint of this invention, as can other types of blocking mechanisms. Those skilled in the art will recognize that various actuators and linking elements can be used, and that some may include multiple component parts. A wide range of ramps can be used, including linear and non-linear ramps that translate, rotate, or move with a combination of rotation and translation. Many springs can be used to perform the biasing and holding functions described above.

It is therefore intended that the foregoing detailed description be regarded as illustrative rather than limiting, and that it be understood that it is the following claims, including all equivalents, which are intended to define the scope of this invention.

We claim:

1. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

a tool head engaging element movably mounted in the drive stud of the second part to engage the tool head when in an engaging position and to release the tool head when in a releasing position;

a linking element coupled to the engaging element and movable to alter effectiveness of the engaging element in retaining a tool head on the drive stud of the second part; and an actuator coupled to the linking element, said actuator manually movable by a user to move the linking element to affect retention of the tool head by the tool head engaging element;

wherein the actuator is mounted between the second part and the coupling element adjacent to the drive stud of the second part.

2. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

- a tool head engaging element movably mounted in the drive stud of the second part to engage the tool head when in an engaging position and to release the tool head when in a releasing position;
- a linking element coupled to the engaging element and movable to alter effectiveness of the engaging element in retaining a tool head on the drive stud of the second part; and
- an actuator coupled to the linking element, said actuator manually movable by a user to move the linking element to affect retention of the tool head by the tool head engaging element;
- wherein the second joint portion comprises two spaced arms, wherein the coupling element is positioned between the two spaced arms, and wherein the actuating element extends between the two spaced arms to a perimeter of the second part.

3. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, tile improvement comprising:
- a tool head engaging element movably mounted in the drive stud of the second part to engage the tool head when in an engaging position and to release the tool head when in a releasing position;
- a linking element coupled to the engaging element and movable to alter effectiveness of the engaging element in retaining a tool head on the drive stud of the second part; and
- an actuator coupled to the linking element, said actuator manually movable by a user to move the linking element to affect retention of the tool head by the tool head engaging element;
- wherein said linking element allows the tool head engaging element to move to the releasing position when the actuator is moved to a first position, and holds the tool head engaging element in the engaging position when the actuator is moved to the second position to retain the tool head on the drive stud of the second part more securely when the actuator is moved to a second position;
- wherein the drive stud of the second part defines a longitudinal axis;
- wherein the actuator comprises an element slideably mounted to the second part to slide transversely to the longitudinal axis, said element contacting the linking element and contoured such that, when the actuator is in the first position, the actuator allows the tool head engaging element to move to the releasing position, and, when the actuator is in the second position, the actuator substantially blocks the tool head engaging element from moving to the releasing position.

4. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:
- user-operated means coupled to the second part for selectively altering retention forces tending to retain a tool head on the drive stud of the second part, said means comprising an actuator accessible for manipulation by a user between first and second positions;
- wherein the second joint portion comprises two spaced arms, wherein the coupling element is positioned between the two spaced arms, and wherein the actuating element extends between the two spaced arms to a perimeter of the second part.

5. In a universal joint for use with a torque transmitting tool, said universal joint comprising a first part defining a recess configured to receive a drive stud of said tool and a first pair of spaced, parallel arms; a second part comprising a drive stud configured to engage a tool head and a second pair of spaced, parallel arms; and an articulated coupler having first and second orthogonal pivot axes, said coupler pivotably mounted between the first pair of arms at the first pivot axis and pivotably mounted between the second pair of arms at the second pivot axis; the improvement comprising:
- a ramp mounted for sliding movement in the drive stud of the second part along a central axis extending parallel to the second pair of arms, said ramp tapering progressively from an elevated portion closer to the second pair of arms to a lowered portion farther from the second pair of arms;
- a tool head engaging element movably mounted in the drive stud of the second part adjacent the ramp, said tool head engaging element held in a tool head engaging position by the ramp when the elevated portion is aligned with the tool head engaging element, said tool head engaging element movable to a tool head releasing position when the lowered portion of the ramp is aligned with the tool head engaging element;
- an actuator mounted to the ramp to extend transversely of the central axis between the second pair of arms between the coupler and the drive stud of the second part, said actuator comprising a gripping portion configured to be manipulated by a user to move the actuator and via the actuator the ramp relative the coupler and the tool head engaging element.

6. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:
- a tool head engaging element movably mounted in the drive stud of the second part to engage the tool head when in an engaging position and to release the tool head when in a releasing position;
- a linking element coupled to the engaging element and movable to alter effectiveness of the engaging element in retaining a tool head on the drive stud of the second part; and an actuator coupled to the linking element, said actuator manually movable by a user to move the linking element to affect retention of the tool head by the tool head engaging element;

wherein the actuator comprises a plate mounted between the second part and the coupling element.

7. In a universal joint for use with a torque transmitting tool, said universal joint comprising a first part comprising a recess configured to receive a drive stud of the tool and a first joint portion; a second part comprising a drive stud configured to engage a tool head and a second joint portion; and at least one coupling element coupled between the first and second joint portions, said at least one coupling element transmitting torque between the first and second parts while allowing the first and second parts to rotate with the first part positioned in a skew orientation with respect to the second part, the improvement comprising:

user-operated means coupled to the second part for selectively altering retention forces tending to retain a tool head on the drive stud of the second part, said means comprising an actuator accessible for manipulation by a user between first and second positions;

wherein the actuator comprises a plate mounted between the second part and the coupling element.

8. The invention of claim 1 or 2, wherein said linking element accommodates movement of the tool head engaging element to the releasing position when the actuator is in a first position, and to the engaging position when the actuator is in a second position to allow the user to release the tool head from the second part by moving the actuator to the first position.

9. The invention of claim 1 or 2, wherein said linking element allows the tool head engaging element to move to the releasing position when the actuator is moved to a first position, and holds the tool head engaging element in the engaging position when the actuator is moved to the second position to retain the tool head on the drive stud of the second part more securely when the actuator is moved to a second position.

10. The invention of claim 1 or 2 wherein the linking element comprises a ramp tapering progressively from an elevated portion to a lowered portion.

11. The invention of claim 10 wherein the elevated portion of the ramp is positioned nearer than the lowered portion of the ramp to the actuator, and wherein the linking element is mounted for sliding movement in the drive stud of the second part.

12. The invention of claim 10 wherein the ramp extends circumferentially around at least a portion of the linking element, and wherein the linking element is mounted for rotation in the drive stud of the second part.

13. The invention of claim 10 wherein the tool head engaging element bears on the ramp such that the elevated portion holds the tool head engaging element in the engaging position and the lowered portion allows the tool head engaging element to move to the releasing position.

14. The invention of claim 1 or 2 wherein the tool head engaging element is spherical.

15. The invention of claim 8 further comprising a spring interposed between the second part and the linking element to bias the actuator to the second position.

16. The invention of claim 1 further comprising a spring interposed between the second part and the linking element to releasably hold the actuator in a selected position.

17. The invention of claim 4 wherein said means releases the tool head from the drive stud of the second part when the actuator is moved by the user to the first position.

18. The invention of claim 4 wherein said means retains the tool head on the drive stud of the second part more effectively when the actuator is in the second position than in the first position.

19. The invention of claim 5 wherein the tool head engaging element is spherical.

20. The invention of claim 5 further comprising:
a spring mounted in the second part to bias the ramp away from the coupler, thereby biasing the elevated portion of the ramp into alignment with the socket engaging element.

21. The invention of claim 5 wherein said gripping portion is disposed near a peripheral portion of the second part.

22. The invention of claim 5 wherein the actuator comprises a plate mounted between the second part and the coupling element.

23. The invention of claim 22 or 6 or 7 wherein the drive stud of the second part defines a longitudinal axis, and wherein the plate is mounted to move in the second part along a direction transverse to the longitudinal axis.

24. The invention of claim 22 or 6 or 7 wherein the plate comprises end portions at two diametrically opposed peripheral portions of the second part.

25. The invention of claim 22 or 6 or 7 wherein the drive stud of the second part defines a longitudinal axis, and wherein the plate defines two opposed major surfaces oriented transverse to the longitudinal axis.

* * * * *

UNITED STATES PATENT AND TRADEMARK OFFICE
CERTIFICATE OF CORRECTION

PATENT NO. : 5,433,548
DATED : July 18, 1995
INVENTOR(S) : Peter M. Roberts et al.

It is certified that error appears in the above-indentified patent and that said Letters Patent is hereby corrected as shown below:

Column 7, line 29

In claim 3, line 12, delete "tile" and substitute --the--.

Signed and Sealed this

Seventh Day of May, 1996

Attest:

BRUCE LEHMAN

Attesting Officer

Commissioner of Patents and Trademarks